(12) United States Patent
Fujioka et al.

(10) Patent No.: US 7,704,134 B2
(45) Date of Patent: Apr. 27, 2010

(54) GAME PROGRAM, GAME DEVICE, AND GAME METHOD

(75) Inventors: Kenji Fujioka, Tokyo (JP); Naoki Nishikawa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 452 days.

(21) Appl. No.: 11/685,787

(22) Filed: Mar. 14, 2007

(65) Prior Publication Data

US 2007/0155457 A1      Jul. 5, 2007

Related U.S. Application Data

(63) Continuation of application No. PCT/JP2005/016625, filed on Sep. 9, 2005.

(30) Foreign Application Priority Data

Sep. 21, 2004   (JP) .............................. 2004-273575

(51) Int. Cl.
    *A63F 9/24*        (2006.01)
(52) U.S. Cl. ................. 463/3; 463/23; 463/43
(58) Field of Classification Search .................. None
     See application file for complete search history.

(56) References Cited

U.S. PATENT DOCUMENTS

| | | | |
|---|---|---|---|
| 5,435,554 A * | 7/1995 | Lipson | 463/3 |
| 6,217,444 B1 * | 4/2001 | Kataoka et al. | 463/3 |
| 6,270,413 B1 * | 8/2001 | Aikawa et al. | 463/31 |
| 6,482,090 B1 | 11/2002 | Rimoto et al. | |
| 7,223,169 B2 * | 5/2007 | Imaeda et al. | 463/3 |

FOREIGN PATENT DOCUMENTS

| | | |
|---|---|---|
| EP | 1 224 960 A1 | 7/2002 |
| JP | 2000-167252 A | 6/2000 |
| JP | 2002-000939 A | 1/2002 |
| JP | 2003-275462 A | 9/2003 |

OTHER PUBLICATIONS

EA Sports, Tiger Woods PGA Tour 2004 [CD-ROM], Sep. 22, 2003, p. 7, XP002478928, Surrey, United Kingdom.
EA Sports, Tiger Woods PGA Tour 2004 release date info, Sep. 22, 2003, XP002478929, [retrieved on Apr. 30, 2008]. Retrieved from the Internet: <URL: www.gamefaqs.com/console/xbox/data/914791.html>.

(Continued)

*Primary Examiner*—M. Sager
(74) *Attorney, Agent, or Firm*—Global IP Counselors, LLP (57) ABSTRACT

With a game implemented by the present game program, an expected pass display area of a ball will be displayed on a monitor between a dispatch position of the ball and a arrival position of the ball. When a dispatch operation of a pitcher character is initiated, the contact position of a command means in the expected pass display area will be identified if the command means is placed into contact with the expected pass display area. If the contact position is moved in the expected pass display area by the command means before a character has dispatched a moving object, the contact position after movement will be identified as the final contact position. When this occurs, a ball character will be dispatched from the pitcher character to the final contact position.

6 Claims, 5 Drawing Sheets

OTHER PUBLICATIONS

"Jikkyo Powerful Pro-Yakyu Basic Ban 2001 Perfect Guide"; Konami Co., Ltd.; Jun. 2001; 1$^{st}$ edition: pp. 8, 9 and 16-19.

"Geki Kukan Pro-Yakyu Pro no Senjutsu Maruwakari Koryakubon" DigiCube Co.; Jan. 2001; 1$^{st}$ edition; p. 8 and 9.

* cited by examiner

GAME PROGRAM, GAME DEVICE, AND GAME METHOD

CROSS-REFERENCE TO RELATED APPLICATIONS

This application is a continuation application of International Application No. PCT/JP2005/016625 filed on Sep. 5, 2005. The entire disclosures of International Application No. PCT/JP2005/016625 is hereby incorporated herein by reference.

This application also claims priority to Japanese Patent Application No. 2004-273575. The entire disclosure of Japanese Patent Application No. 2004-273575 is hereby incorporated herein by reference.

BACKGROUND OF THE INVENTION

1. Field of the Invention

The present invention relates to a game program, and in particular to a game program for causing a computer to implement a game that will dispatch a moving object from a character displayed on a touch panel type of monitor. In addition, the present invention relates to a game device and a game method that is implemented by this game program.

2. Background Information

Various video games have been proposed in the past. Various video games now allow one to issue various commands to a character displayed on a monitor by operating an input unit that is independent of a game unit, e.g., various input buttons on a controller, or by operating various input buttons that are integrally provided on the game unit. For example, a standard game device has a monitor, a game unit that is separate from the monitor, and a controller that is separate from the game unit. A plurality of input buttons are arranged on the controller. In addition, a portable game device has a game unit, a liquid crystal monitor arranged in the approximate central portion of the game unit, and a plurality of input buttons that are arranged on both sides of the liquid crystal monitor. With this type of game device, various commands can be issued to a character displayed on the monitor by operating at least one of the plurality of input buttons.

Thus, one known video game in which commands to a character are performed from input buttons includes a competitive video game, e.g., a baseball game, in which athlete characters are displayed on a monitor and a competition takes place. With this baseball game, when the player operates a pitcher, the player can move the mitt position of the catcher character by selectively pushing the directional command button during the pitching motion of the pitcher character. Then, the ball character will be thrown to the mitt position of the catcher character when the moving object, e.g., the ball character, is released by the pitcher character.

With a conventional baseball game, a player can indicate the course in which the pitcher character will throw the ball to the catcher character by selectively operating the directional command buttons. For example, by selectively and continuously pushing the right direction command button and the down direction command button, a player can cause the mitt position of the catcher character to move to a position at the lower inside corner of a left-handed batter. When this occurs, the ball character released by the pitcher character will be thrown to the mitt position of the catcher character that is at the lower inside corner of the left-handed batter.

Here, the player must continuously push the right direction command button and continuously push the down direction command button, and cause the mitt position of the catcher character to move to the lower inside corner position of the left-hand batter, within a period of time that is limited by the pitching motion of the pitcher character. Because of this, if there is a distance between the mitt position of the catcher and the desired course position, e.g., the lower inside corner of a left-handed batter, the ball character may be released from the pitcher character before the mitt position of the catcher character arrives at the lower inside corner position of the left-handed batter. In other words, the ball may be placed on a course that is different from the desired course.

In view of the above, it will be apparent to those skilled in the art from this disclosure that there exists a need to make it possible to accurately and easily place a moving object in a desired position. This invention addresses this need in the art as well as other needs, which will become apparent to those skilled in the art from this disclosure.

SUMMARY OF THE INVENTION

A game program according to a first aspect of the present invention is a program for implementing the following functions on a computer capable of implementing a game in which a moving object is dispatched from a character displayed on a touch panel type of monitor.

(1) A pass area setting function that sets an expected pass display area of a moving object between a dispatch position of the moving object and an arrival position of the moving object.

(2) A dispatch operation initiation function that will initiate a character dispatch operation.

(3) A contact position identification function that identifies a contact position of a command means in the expected pass display area when the command means is placed in contact with the expected pass display area of the monitor.

(4) A contact position movement function that will make the contact position of the command means movable in the expected pass display area until the moving object is dispatched from the character.

(5) A final contact position identification function that will identify the contact position after movement as a final contact position.

(6) A moving object dispatch function that will dispatch the moving object from the character to the final contact position.

With the game implemented by this program, the expected pass display area of the moving object will be set between the dispatch position of the moving object and the arrival position of the moving object with the pass area setting function. The dispatch operation of the character will be initiated with the dispatcher operation initiation function. With the contact position identification function, the contact position of the command means in the expected pass display area will be identified when the command means is placed in contact with the expected pass display area of the monitor. The contact position movement function makes the contact position of the command means movable in the expected pass display area until the moving object is dispatched from the character. The final contact position identification function will identify the contact position after movement as the final contact position. The moving object dispatch function will dispatch the moving object from the character to the final contact position.

With this game program, when a dispatch operation has been initiated by a character, the contact position of the command means in the expected pass display area will be identified if the command means is placed into contact with the expected pass display area of the monitor. Here, the contact position of the command means is made movable in the expected pass display area until the moving object is dispatched from the character. Then, if the contact position after movement is identified as the final contact position, the moving object will be dispatched from the character to the final contact position.

For example, consider a case in which a baseball game is implemented on a touch panel type of monitor, and a player causes the pitcher character to pitch the ball. Here, with the game program described above, when a dispatch operation has been initiated by the pitcher character, the contact position of the command means in the expected pass display area will be identified if the player places the command means into contact with the expected pass display area of the monitor. Then, the player can move the contact position in the expected pass display area by means of the command means until the ball character is dispatched from the pitcher character. Then, if the contact position after movement is identified as the final contact position, the ball character will be dispatched from the pitcher character to the final contact position. Thus, the player can cause the ball character to be dispatched from the pitcher character by simply moving the contact position in the expected pass display area with the command means. In this way, the player can accurately and easily place the ball character in a desired position.

A game program according to a second aspect of the present invention is the game program disclosed in the first aspect, in which the contact position of the command means can be moved in the expected pass display area with the contact position movement function until the moving object is dispatched from the character, in response to the characteristics of the character.

Here, the contact position of the command means is movable in the expected pass display area until the moving object is dispatched from the character, in response to the characteristics of the character. Because of this, in a baseball game for example, a player will move the contact position of the command means in the expected pass display area in response to the characteristics of a character, e.g., the ability of the pitcher character to control the ball. Because of this, the player can experience a state in which the contact position is easy to move and a state in which the contact position is difficult to move, in response to the ability of the pitcher character to control the ball.

A game program according to a third aspect of the present invention is the game program of the second aspect, in which the contact position movement function includes a movement speed change function that will change the movement speed of the contact position in the expected pass display area in response to the characteristics of the character.

Here, the movement speed of the contact position in the expected pass display area will be changed in response to the characteristics of the character. Because of this, in a baseball game for example, a player must move a contact position that changes movement speed in the expected pass display area with the command means, in response to the characteristics of a character, e.g., the ability of the pitcher character to control the ball. In this way, the player can experience a state in which the contact position is easy to move and a state in which the contact position is difficult to move, in response to the ability of the pitcher character to control the ball.

A game program according to the fourth aspect is the game program of any of the first to third aspects, and is a program for implementing the following function in a computer.

(7) A pass position display function that will display the expected pass position of a moving object with a predetermined object in the expected pass display area when the dispatch operation of a character is initiated.

With a game that is implemented by this game program, when the dispatch operation of a character is initiated, the expected pass position of a moving object will be displayed with a predetermined object in the expected pass display area with the pass position display function. In addition, the contact position identification function includes an expected pass position identification function that will identify the expected pass position as the contact position of the command means when the command means is placed in contact with the expected pass position.

Here, the expected pass position of a moving object will be displayed with a predetermined object in the expected pass display area when the dispatch operation of a character is initiated. In addition, when the command means is placed in contact with the expected pass position, the expected pass position will be identified as the contact position of the command means. Because of this, in a baseball game for example, if a player places the command means in contact with the position of the object displayed at the expected pass position when a dispatch operation of a character is initiated, the expected pass position will be identified as the contact position of the command means. In this way, the player can visually ascertain the initial position of the expected pass position by means of the object, and the initial position can be used as a reference point when moving the command means.

A game program according to a fifth aspect of the present invention is the game program of the fourth aspect, and is a program for implementing the following function in a computer.

(8) A moving contact position display function that will display a predetermined object in the contact position during movement when the contact position identified by the expected pass position identification function is moved in the expected pass display area.

With a game implemented by this game program, when the contact position identified by the expected pass identification function is moved in the expected pass display area with the moving contact position display function, a predetermined object will be displayed in the contact position during movement.

Here, a predetermined object will be displayed in the contact position during movement when the identified contact position is moved in the expected pass display area. Because of this, in a baseball game for example, if a player moves the contact position in the expected pass display area, the player can visually ascertain the contact position during movement by means of the predetermined object.

A game program according to a sixth aspect of the present invention is the game program of any of the first to fifth aspects, in which the final contact position identification function includes a monitor separation determination function that determines whether or not the command means has been separated from the monitor. Then, if it is determined with the monitor separation determination function that the command means has been separated from the monitor, the contact position will be identified as the final contact position at the point in time at which the command means is separated from the monitor. In addition, if it is determined with the monitor separation determination function that the command means has not been separated from the monitor, the contact position will be identified as the final contact position at the point in time at which the moving object is dispatched from the character.

Here, if it is determined that the command means has been separated from the monitor, the contact position will be identified as the final contact position at the point in time that the command means has been separated from the monitor. In addition, if it is determined that the command means has not been separated from the monitor, the contact position will be identified as the final contact position at the point in time at which the moving object is dispatched from the character. Because of this, in a baseball game for example, when a player separates the command means from the monitor, the contact position of the command means can be set as the final pitching position of the pitching character. In addition, if the player has not separated the command means from the monitor, the contact position at the point in time at which the ball character is dispatched from the pitcher character can be set as the final pitching position of the pitching character.

A game device according to a seventh aspect of the present invention is a game device that can implement a game in which a moving object is dispatched from a character displayed on a touch panel type of monitor. This game device comprises pass area setting means, dispatch operation initiation means, contact position identification means, contact position movement means, final contact position identification means, and moving object dispatch means. The expected pass display area of a moving object will be set with the pass area setting means between a dispatch position of the moving object and an arrival position of the moving object. The dispatch operation of the character will be initiated with the dispatch operation initiation means. The contact position of the command means in the expected pass display area will be identified with the contact position identification means when the command means is placed in contact with the expected pass display area of the monitor. The contact position movement means makes the contact position of the command means movable in the expected pass display area until the moving object is dispatched from the character. The final contact position identification means will identify the contact position after movement as the final contact position. The moving object dispatch means will dispatch the moving object from the character to the final contact position.

A game method according to an eighth aspect of the present invention is a game method that can implement a game in which a moving object is dispatched from a character displayed on a touch panel type of monitor. This game method comprises a pass area setting step, a dispatch operation initiation step, a contact position identification step, a contact position movement step, a final contact position identification step, and a moving object dispatch step. The expected pass display area of a moving object will be set with the pass area setting step between a dispatch position of the moving object and an arrival position of the moving object. The dispatch operation of the character will be initiated with the dispatch operation initiation step. With the contact position identification function, the contact position of the command means in the expected pass display area will be identified when the command means is placed in contact with the expected pass display area of the monitor. The contact position movement step makes the contact position of the command means movable in the expected pass display area until the moving object is dispatched from the character. The final contact position identification step will identify the contact position after movement as the final contact position. The moving object dispatch step will dispatch the moving object from the character to the final contact position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Construction of the Game Device

Figure 1:
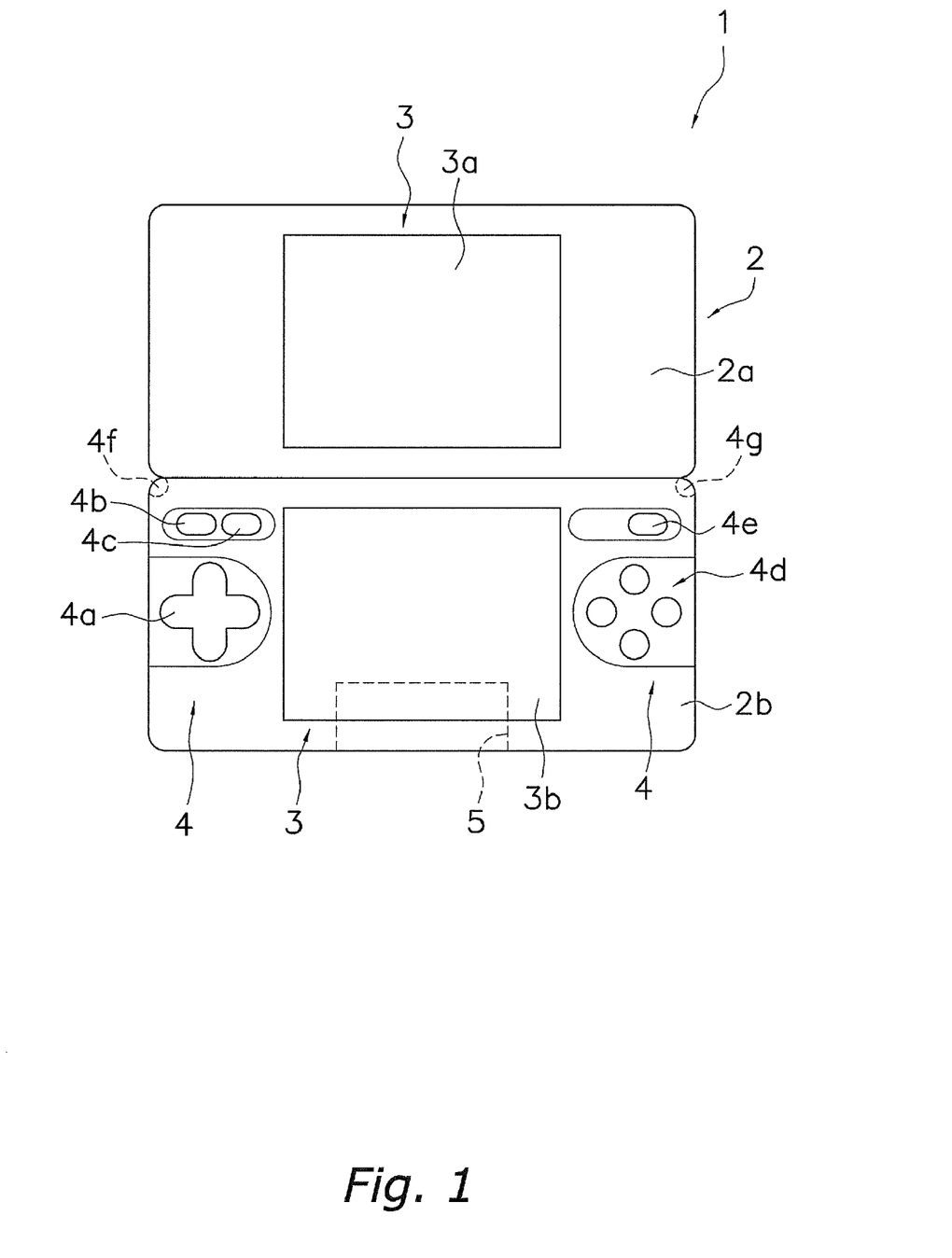
FIG. 1 is an external view of a portable game unit (an example of a computer) that can use a game program according to the present invention.

FIG. 1 is an external view of a portable game unit (an example of a computer) that can use a game program according to the present invention. In addition, FIG. 2 is one example of a control block diagram of the portable game unit.

As shown in FIG. 1, the portable game unit 1 primarily has a main case 2, a liquid crystal monitor unit 3, an input unit 4, a cartridge mounting unit 5, and a communication unit (not shown in the drawings). The main case 2 has an upper case 2a and a lower case 2b. The upper case 2a and the lower case 2b are connected to each other such that they can be opened and closed. The liquid crystal monitor unit 3 comprises an upper liquid crystal monitor 3a provided in the upper case 2a, and a lower liquid crystal monitor 3b provided in the lower case 2b. Here, for example, the upper liquid crystal monitor 3a is a non-touch panel type monitor, and the lower liquid crystal monitor 3b is a touch panel type monitor. The non-touch panel type monitor is comprised of a liquid crystal panel, and the touch panel type monitor is comprised of a liquid crystal panel and a touch panel. On the touch panel type monitor, the display surface of the liquid crystal panel and the data input surface of the touch panel are laminated together so as to be integral with each other. The input unit 4 comprises a cross-shaped directional command button 4a that is arranged on the central portion of the left side of the lower case 2b, a select button 4b and a start button 4c arranged from left to right on the upper portion of the left side of the lower case 2b, command buttons 4d that are arranged in the central portion of the right side of the lower case 2b, a power button 4e that is arranged on the upper portion of the right side of the lower case 2b, and an L button 4f and a R button 4g arranged on the left and right corners of the lower case 2b. The cartridge mounting unit 5 is provided in the lower portion of the lower case 2b. A game cartridge or the like can be mounted in the cartridge mounting unit 5. The communication unit is built into the main case 2, e.g., the lower case 2a. A local wireless network function, internet connection via wireless LAN function, or the like are provided by the communication unit. Note that a sound volume adjustment button, an earphone jack, and the like are provided in the game unit 1, but an explanation of these will be omitted.

Figure 2:
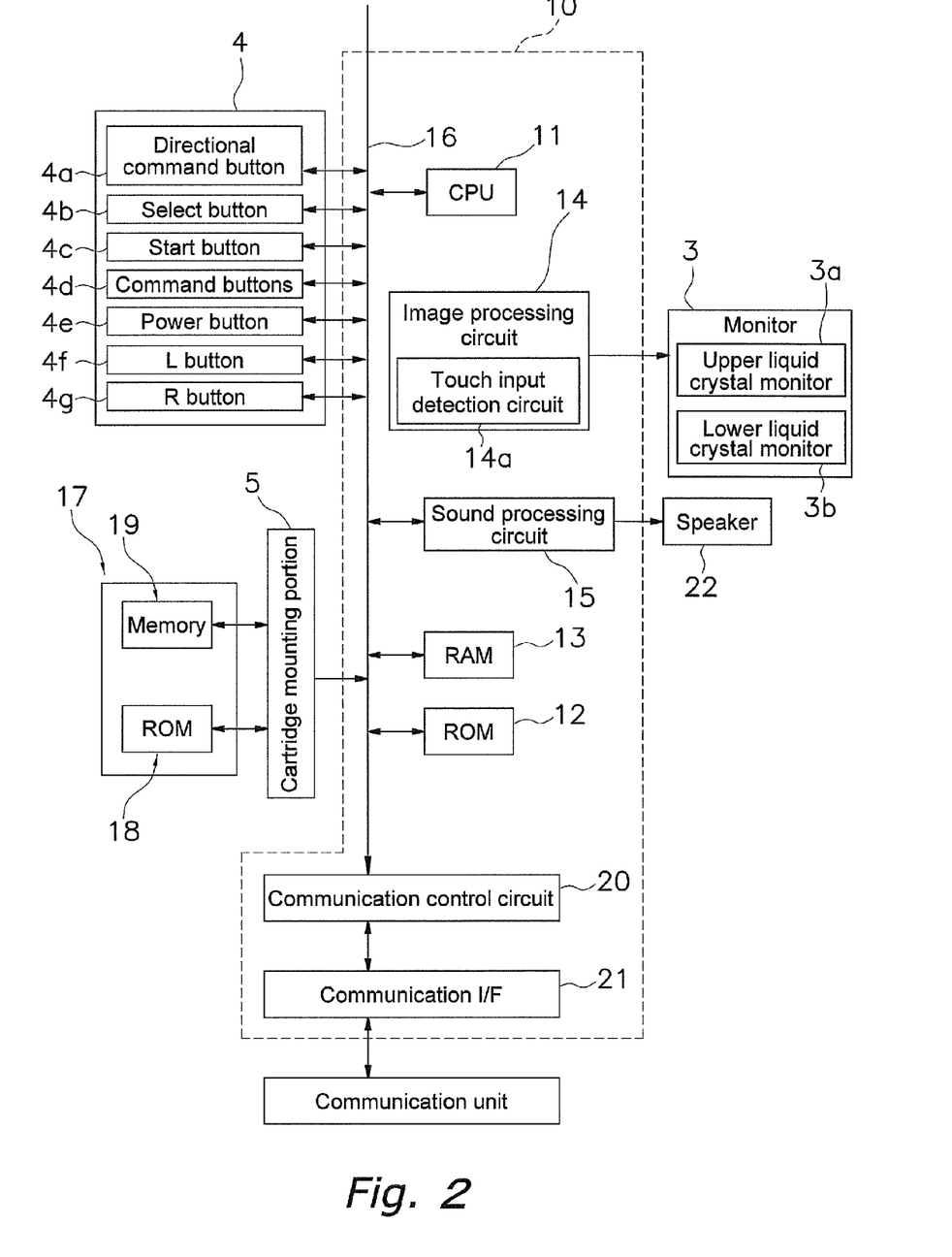
FIG. 2 is an example of a control block diagram of the portable game unit.

As shown in FIG. 2, the portable game unit 1 has a control device 10 in the interior thereof. A CPU (Central Processing Unit) 11 which uses a microprocessor, a ROM (Read Only Memory) 12 as a main storage device, a RAM (Random Access Memory) 13, an image processing circuit 14, a sound processing circuit 15, and a communication control circuit 20 of the control device 10 are connected to each other via a bus 16.

The CPU 11 will interpret instructions from a game program, and will perform various types of data processing and control. The ROM 12 will store programs and the like needed for basic control of the game unit 1 (e.g., start-up control). The RAM 13 will maintain a working area for the CPU 11. The image processing circuit 14 controls the liquid crystal monitor unit 3 in response to rendering commands from the CPU 11, and displays predetermined images on at least one of the upper liquid crystal monitor 3a and the lower liquid crystal monitor 3b. In addition, a touch input detection circuit 14a is included in the image processing circuit 14. When a command means, e.g., a touch pen, a finger, or the like is brought into direct contact with the touch panel, coordinate date of the contact position will be supplied from the touch input detection circuit 14a to the CPU 11, and the contact position will be identified by the CPU 11. In addition, when the command means is brought into direct contact with the touch panel at the position of a target object displayed on the liquid crystal panel, coordinate data of the target object will be supplied from the touch input detection circuit 14a to the CPU 11, and the target object will be identified by the CPU. The sound processing circuit 15 will produce analog audio signals in response to sound generation commands from the CPU 11, and will output the same to a speaker 22. The communication control circuit 20 is included in the communication unit, and is employed in order to wirelessly connect the game unit 1 to another game unit or the like. The communication control circuit 20 is connected to the CPU 11 via the bus 16. In response to instructions from the CPU 11, the communication control circuit 20 will control and dispatch connection signals for connecting the game unit 1 to the internet via a local wireless network or a wireless LAN.

An external storage device 17 that is separate from the control device 11 is connected to the bus 16. For example, the external storage device 17 is a game cartridge that is removably mounted in the main case 2, e.g., the lower case 2b. A ROM 18 as a storage medium, and a memory 19 as a rewriteable user memory, are provided in the interior of the external storage device 17. A game program that causes the game unit 1 to function as a computer, and various types of data needed in the execution of the game program, are stored in advance in the ROM 18. The various types of data include various types of character image data, e.g., various types of panel image data, attribute image data, and the like. Rewriteable memory such as flash memory is used in the memory 19. Saved game data or the like will be stored in the memory 19 in response to need. Note that the storage medium of the external storage device 17 is not limited to a semiconductor memory element, and various other types of storage media may be used, such as a magnetic storage medium, an optical storage medium, a magneto-optical storage medium, or the like. Note also that an interface circuit is interposed between the bus 16 and each element, but illustration of these will be omitted here.

With the game unit 1 constructed as described above, a player can play various game genres on the liquid crystal monitor unit 3 by loading a game program stored in the ROM 18 of the external storage device 17, and executing the loaded game program with the CPU 11. In addition, by connecting the game unit 1 with another game unit with a wireless network, or connecting the game unit 1 with another game unit via a communication cable or the like, data can be exchanged with another game unit or a competition type game can be played via the communication control circuit 10.

Summary of Various Types of Processes in the Game Device

Figure 3:
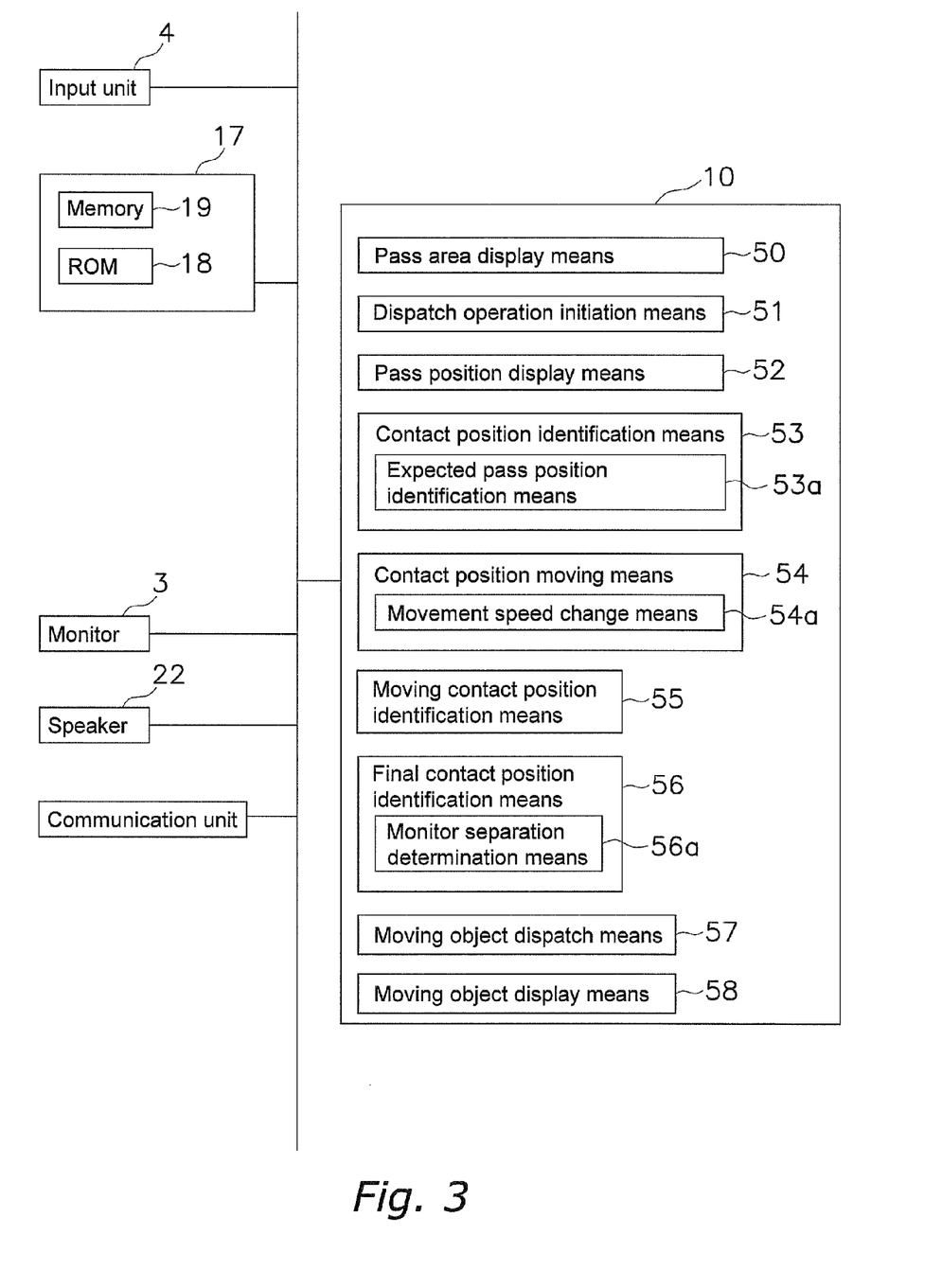
FIG. 3 is an example of a function block diagram of the portable game unit.

A game that can be executed in the present game unit 1 is, for example, a baseball game. FIG. 3 is a function block diagram for explaining the functions that play an essential role in the present invention.

With the present game unit 1, a moving object will be dispatched from a character displayed on a touch panel type of monitor. This game unit 1 comprises pass area setting means 50, dispatch operation initiation means 51, pass position display means 52, contact position identification means 53, expected pass position identification means 53a, contact position movement means 54, moving speed change means 54a, moving contact position display means 55, final contact position identification means 56, monitor separation determination means 56a, moving object dispatch means 57, and moving object display means 58.

The pass area setting means 50 is implemented by a function that sets the expected pass display area, e.g., the hitting plane, of a ball character between the dispatch position of the ball character and the arrival position of the ball character. With the pass area setting means 50, the coordinate data of the predetermined position between the dispatch position of the ball character and the arrival position of the ball character, e.g., the position coordinate data of home base, will be calculated by the CPU 11 based upon the coordinate data of the dispatch position of the ball character and the coordinate data of the arrival position of the ball character. Then, based upon the position coordinate data of home base, the hitting plane will be set above home base. Note that the hitting plane is a virtual plane where a batter character will hit a ball character with a bat character. A strike zone for the batter is set in the hitting plane by the CPU 11. Note that the coordinate data of the dispatch position of the ball character shown here is the position coordinate data of the pitcher character, and the coordinate data of the arrival position of the ball character is the position coordinate data of the catcher character.

The dispatch operation initiation means 51 is implemented by a function that initiates a character dispatch operation. With the dispatch operation initiation means 51, the CPU 11 that received command signals from the operation means or the command means will initiate a dispatch operation with a character.

The pass position display means 52 is implemented by a function that will display the expected pass position of a moving object with a predetermined object in the expected pass display area when the character dispatch operation is initiated. With the pass position display means 52, when a character dispatch operation is initiated, the expected pass position of the ball will be calculated by the CPU 11, and the expected pass position of the ball will be displayed on the monitor 3, i.e., the lower monitor 3b, by the image processing circuit 14. More particularly, the expected pass position of the ball will be displayed on the touch panel liquid crystal panel of the lower monitor 3b. The expected pass position of the ball will be displayed in the expected pass display area displayed on the monitor, e.g., the hitting plane, by employing a predetermined object read out from the ROM 18 and stored in the RAM 13.

The contact position identification means 53 is implemented by a function that identifies the contact position of the command means in the hitting plane when the contact means is placed in contact with the monitor. With the contact position identification means 53, when the command means, e.g., a touch pen, a finger, or the like, is brought into contact with the touch panel in the hitting plane displayed on the liquid crystal panel, the coordinate data of the contact position of the command means will be supplied from the touch input detection circuit 14a to the CPU 11, and the contact position of the command means will be identified by the CPU 11.

The contact position identification means 53 includes expected pass position identification means 53a. The expected pass position identification means 53a is implemented by a function that will identify the expected pass position as the contact position of the command means when the command means is placed into contact with the expected pass position. With the expected pass position identification means 53a, when the command means, e.g., a touch pen, a finger, or the like, is brought into contact with the touch panel in the expected pass position displayed on the liquid crystal panel, the coordinate data of the expected pass position of the command means will be supplied from the touch input detection circuit 14a to the CPU 11, and the expected pass position will be identified by the CPU 11.

The contact position movement means 54 is implemented by a function that makes it possible for the contact position of the command means to be moved in the hitting plane, before the ball character is dispatched from the pitcher character, in response to the characteristics of the pitcher character. With the contact position movement means 54, when the command means, e.g., a touch pen, a finger, or the like, is placed into contact with and moved in the hitting plane before the ball character is dispatched from the pitcher character in response to the characteristics of the pitcher character, e.g., the ability of the pitcher character to control the ball, the coordinate data of the contact position of the command means will be continuously supplied from the touch input detection circuit 14a to the CPU 11, and the movement of the contact position of the command means will be identified by the CPU 11.

In addition, the contact position movement means 54 includes a movement speed change means 54a. The movement speed change means 54a is implemented by a function that will change the movement speed of the contact position in the expected pass display area in response to the characteristics of a character. With the movement speed change means 54a, the detected speed of the touch input detection circuit 14a that detects the coordinate data of the contact position of the command means in the hitting plane will be changed by the CPU 11, in response to the characteristics of the pitcher character, e.g., the ability of the pitcher character to control the ball, stored in the RAM 13.

The moving contact position display means 55 is implemented by a function that will display a predetermined object in the contact position during movement, when the contact position identified by the expected pass position identification means 53a is moved by the command means in the expected pass display area.

The moving contact position display means 55 is implemented by a function that will display a predetermined object in the contact position during movement, when the contact position identified by the expected pass position identification means 53a is moved by the command means in the hitting plane. With the moving contact position display means 55, when the contact position identified by the expected pass position identification means 53a is moved by the command means in the hitting plane, the coordinate data of the contact position of the command means will be continuously supplied from the touch input detection circuit 14a to the CPU 11, and the movement of the contact position of the command means will be identified by the CPU 11. At this point, the predetermined object stored in the RAM 13 will be displayed by the image processing circuit 14 in a position on the monitor 3 that corresponds to the coordinates of the contact position during movement, e.g., a position on the lower monitor 3b that corresponds to the coordinates of the contact position during movement. More particularly, the predetermined object will be displayed on the touch panel liquid crystal panel of the lower monitor 3b.

The final contact position identification means 56 is implemented by a function that will identify the contact position after movement as the final contact position. With the final contact position identification means 56, the contact position after movement will be identified by the CPU 11 as the final contact position.

The final contact position identification means 56 includes monitor separation determination means 56a. The monitor separation determination means 56b is implemented by a function that will determine whether or not the command means has been separated from the monitor. With the monitor separation determination means 56a, it will be determined by the CPU 11 whether or not the command means, e.g., a touch pen, a finger, or the like, has been separated from the monitor, e.g., the touch panel. For example, if it was determined by the CPU 11 that the touch pen was separated from the touch panel, then at the point in time at which the touch pen is separated from the touch panel, the coordinate data of the contact position of the touch pen will be identified by the CPU 11 as the coordinate data of the final contact position. For example, if it was determined by the CPU 11 that the touch pen was not separated from the touch panel, then at the point in time at which the ball character was dispatched from the pitcher character, the coordinate data of the contact position will be identified by the CPU 11 as the final contact position.

The moving object dispatch means 57 is implemented by a function that causes a moving object to be dispatched from a character in the direction of the final contact position. With the moving object dispatch means 57, command signals that will cause the ball character to be dispatched from the pitcher character, i.e., from the position of the coordinate data of the pitcher character to the position of the coordinate data of the final contact position, will be issued from the CPU 11 to the image processing circuit 14.

The moving object display means 58 is implemented by a function that will display the ball character dispatched from the pitcher character on the monitor. With the moving object display means 58, the ball character that moves from the position of the coordinate data of the pitcher character to the position of the coordinate data of the final contact position will be displayed on the monitor 3, e.g., the lower monitor 3b, by the image processing circuit 14. More particularly, the moving ball character will be displayed on the touch panel liquid crystal panel of the lower monitor 3b.

Summary of the Baseball Game

Next, the specific content of the baseball game of the present embodiment will be explained.

This baseball game primarily comprises a batting system that issues commands with regard to batting to a batter character, a defense system that issues commands with regard to catching and throwing to a fielder character, a pitching system that issues commands with regard to pitching to a pitcher character, and a base running system that issues commands with regard to base running to a base running character. Each of these systems is realized by a game program stored in the ROM 18, for example, and is executed in the game unit 1.

A summary of the pitching system that plays an essential role in the present invention will be explained below.

The pitching system allows a pitching operation to be performed by commanding the pitch location of a pitcher character by means of the command means, e.g., a touch pen, a finger, or the like.

Figure 4:
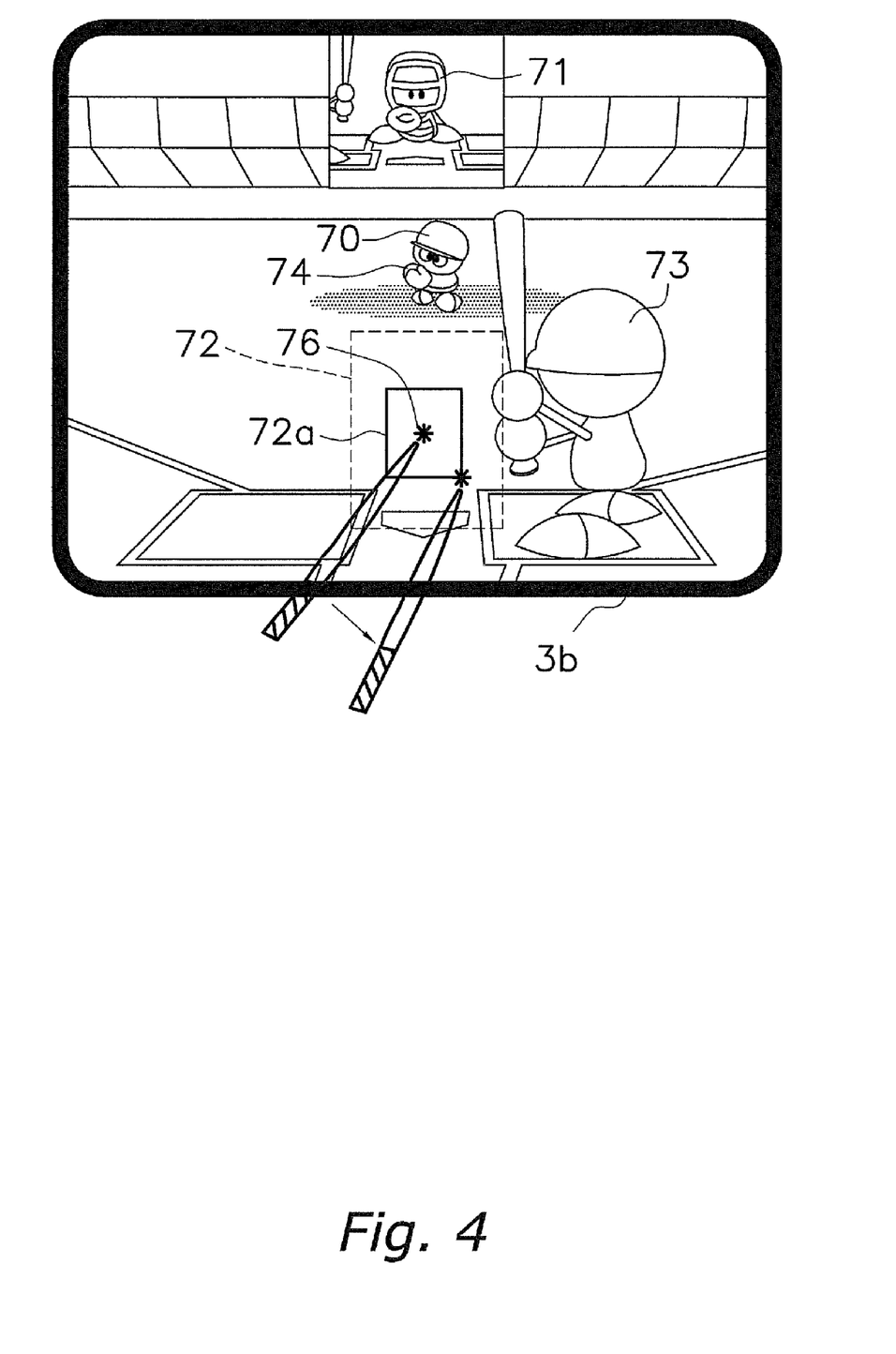
FIG. 4 is an explanation of the pitching system in a baseball game.

In the present baseball game, when a player operates a pitcher character, as shown in FIG. 4, a pitcher character 70, a catcher character 71, a hitting plane 72, a batter character 73, and a ball character 74 will be primarily displayed on the lower touch panel type monitor.

The pitcher character 70 will be displayed in the approximate central portion of the screen, the catcher character 71 will be displayed in the upper portion of the screen, and the batter character 73 will be displayed in the right side portion of the screen. A strike zone 72*a* will be displayed on the hitting plane 72 above home base.

First, the pitcher character 70 will initiate a pitching operation when a player pushes one of the command buttons 4*d*. At this point, the expected pass position of the ball will be displayed on the hitting plane 72 with an asterisk mark 76. Here, the asterisk mark 76 is displayed in the central portion of the strike zone 72*a*. Then, when the player places the touch pen into contact with the hitting plane 72 on the monitor, here, the position of the asterisk mark 76, the contact position of the touch pen on the hitting plane 72 will be identified. Then, if the player moves the contact position of the touch pen in the hitting plane 72, the asterisk mark 76 will move together with the contact position of the touch pen. At this point, the stronger the capabilities of the pitcher character 70 are, the easier it will be to move the touch pen, and the weaker the capabilities of the pitcher character 70 are, the more difficult it will be to move the touch pen. For example, the worst the pitcher character 70's control is, the quicker the movement speed of the contact position identified on the monitor will become, and the more difficult it will become for the player to move the touch pen to the desired position and stop it in the desired position. In other words, because the touch pen slides on the monitor, it will be difficult for the player to maintain the contact position of the touch pen in a stable state and move the contact position. In contrast, the better the pitcher character 70's control is, the slower the movement speed of the contact position identified on the monitor will become, and the easier it will become for the player to move the touch pen to the desired position and stop it in the desired position. In other words, it will be easy for the player to maintain the contact position of the touch pen in a stable state and move the contact position.

Next, if the player moves the contact position of the touch pen to a desired position and separates the touch pen from the monitor during a pitching operation of the pitcher character 70, the position at which the touch pen was separated will be set as the destination of the ball dispatched by the pitcher character 70. Then, the pitcher character 70 will throw the ball to that destination. In contrast, if during the pitching operation of the pitcher character 70, the player has moved the contact position of the touch pen to the desired position, and the pitcher character 70 has released the ball in a state in which the touch pen is not separated from the monitor, the contact position of the touch pen when the pitcher character 70 has released the ball will be set as the destination of the ball dispatched by the pitcher character 70. Then, the pitcher character 70 will throw the ball to that destination. Each process flow during execution of the pitching system The flowchart shown in FIG. 5 will be used to explain the pitching system in the baseball game of the present embodiment.

Figure 5:
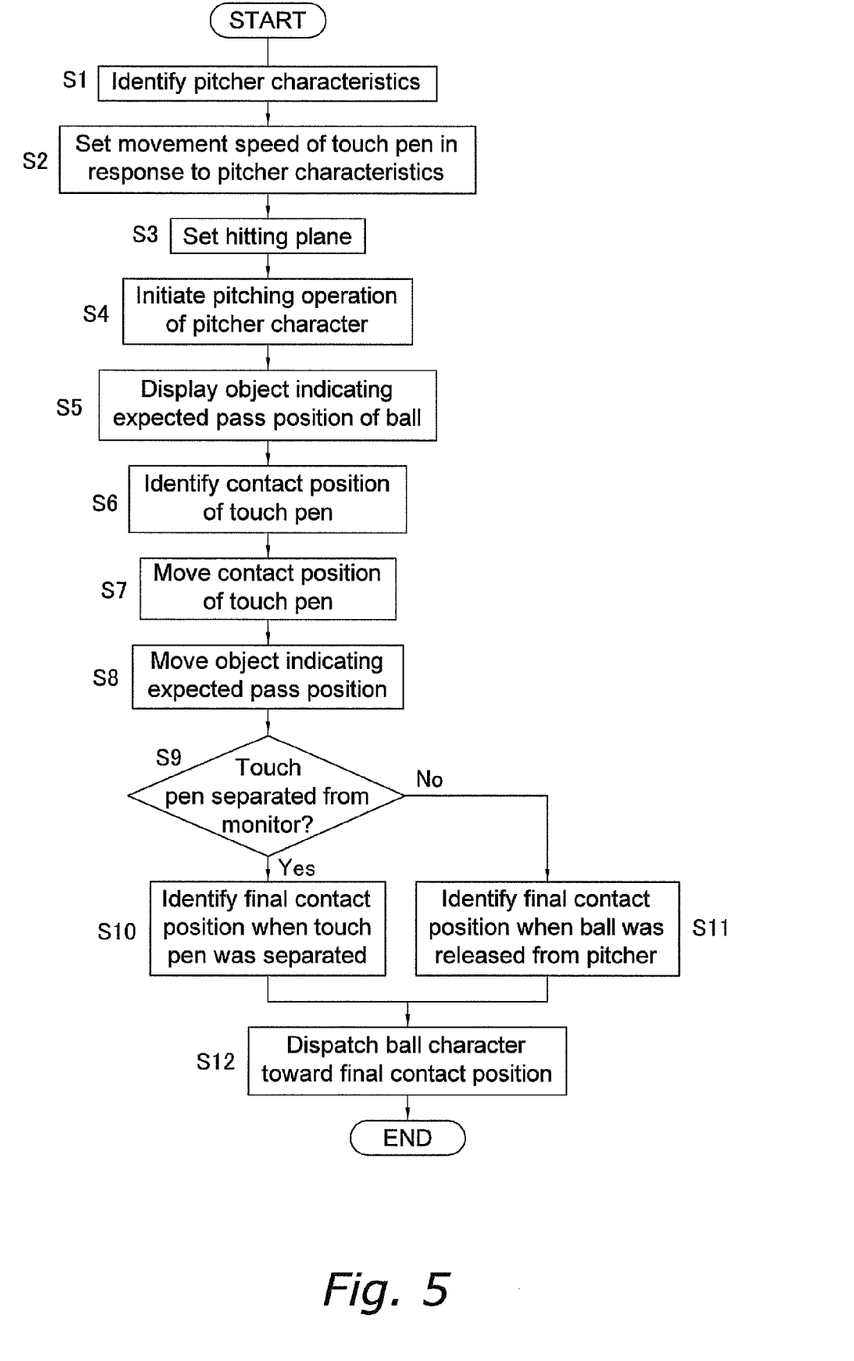
FIG. 5 is a flowchart for explaining the pitching system in a baseball game.

With this baseball game, if a player operates the pitcher character 70, first, the characteristics of the pitcher character 70, e.g., the ability of the pitcher character 70 to control the ball, will be identified (S1). In response to the characteristics of the pitcher character 70, the speed at which the contact position of the touch pen will be moved on the monitor will be set (S2). Then, the hitting plane that includes the strike zone 72*a* will be set in a predetermined position between the dispatch position of the ball character 74 and the arrival position of the ball character 74 (S3). In other words, the hitting plane 72 that includes the strike zone 72 will be set in a position above home base between the position of the pitcher character 70 and the position of the catcher character 71.

Next, when a command button 4*d* is pressed, a dispatch operation of the pitcher character 70 will be initiated (S4). At this point, an object indicating the expected pass position of the ball will be displayed in the hitting plane 72 with, for example, the asterisk mark 76. The expected pass position is the initial dispatch target of the pitcher character 70. Then, the position at which the touch pen was placed into contact with the hitting plane 72, e.g., the expected pass position, will be identified as the contact position of the touch pen (S6). Then, if the contact position of the touch pen is moved in the hitting plane 72 (S7), the object that indicates the expected pass position of the ball, e.g., the asterisk mark 76, will move together with the contact position in response to the set movement speed (S8).

Finally, it will be determined whether or not the touch pen has been separated from the monitor (S9). If it is determined that the touch pen has been separated from the monitor (S9 is yes), then the contact position will be identified as the final contact position of the touch pen at the point in time at which the touch pen was separated from the monitor (S10). If it is determined that the touch pen has been separated from the monitor (S9 is no), the contact position will be identified as the final contact position at the point in time at which the ball character 74 is dispatched from the pitcher character 70. The ball character 74 will be dispatched from the pitcher character 70 in the direction of the final contact position identified above (S12).

Other Embodiments (a) With the aforementioned embodiment, an example was illustrated in which the portable game unit 1 was used as an example of a computer that can utilize the game program, however the game device is not limited to the aforementioned embodiment, and can also utilize in the same way a game device formed separately from a monitor, a game device for commercial use that is formed integrally with a monitor, and a personal computer, a workstation, or the like that functions as a game device by executing a game program.

(b) The present invention also includes a program and method for executing the game described above, and a computer readable storage medium on which the program is stored. Other than the cartridge, examples of recording media include computer readable flexible disks, semiconductor memory, CD-ROM, DVD, MO, ROM cassettes, and the like.

INDUSTRIAL APPLICABILITY

With the present invention, when a dispatch operation has been initiated by a character, the contact position of the command means in the expected pass display area will be identified if the command means is placed into contact with the expected pass display area of the monitor. Here, the contact position of the command means is made movable in the expected pass display area until the moving object is dispatched from the character. Then, if the contact position after movement is identified as the final contact position, the moving object will be dispatched from the character to the final contact position. Because of this, the player can cause a moving object to be dispatched from a character by simply moving the contact position in the expected pass display area with the command means. In this way, the player can accurately and easily place the moving object in a desired position.

What is claimed is:

1. A computer readable medium storing a game program for causing a computer to implement a baseball video game in which a moving object being a ball of the baseball video game is dispatched from a pitcher character displayed on a touch panel type of monitor, the game program comprising:
   code for setting an expected pass display area of a moving object between a dispatch position of the moving object where the pitcher character exists and an arrival position of the moving object where a catcher character exists;
   code for initiating a dispatch operation of the pitcher character;
   code for identifying a contact position of input means in the expected pass display area where the input means is placed into contact with the expected pass display area of the monitor;
   code for allowing the contact position to be movable in the expected pass display area by the input means until the moving object is dispatched from the pitcher character, and changing movement speed of the contact position in the expected pass display area in response to the characteristics of the pitcher character;
   code for identifying the contact position after movement as a final contact position; and
   code for dispatching the moving object from the pitcher character to the final contact position.

2. The computer readable medium according to claim 1, further comprising
   code for displaying the expected pass position of the moving object with a predetermined object in the expected pass display area when the dispatch operation of a character is initiated, wherein
   the code for identifying the contact position includes code for identifying the expected pass position as the contact position of the input means when the input means is placed in contact with the expected pass position.

3. The computer readable medium according to claim 2, further comprising
   code for displaying the predetermined object at the contact position during movement when the contact position identified is moved in the expected pass display area.

4. The computer readable medium according to claim 1, wherein
   the code for identifying the contact position after the movement as the final contact position includes code for determining whether or not the input means has been separated from the monitor,
   if it is determined that the input means has been separated from the monitor, the contact position will be identified as the final contact position before the input means is separated from the monitor, and
   if it is determined that the input means has not been separated from the monitor, the contact position will be identified as the final contact position at which the moving object has been dispatched from the pitcher character.

5. A game device capable of implementing a baseball video game in which a moving object being a ball of the baseball video game is dispatched from a pitcher character to a catcher character which are displayed on a touch panel type of monitor, comprising:
   pass area setting means for setting an expected pass display area of a moving object between a dispatch position of the moving object where the pitcher character exists and an arrival position of the moving object where the catcher character exists;
   dispatch operation initiation means for initiating a dispatch operation of the pitcher character,
   contact position identification means for identifying a contact position of input means in the expected pass display area when the input means is placed into contact with the expected pass display area of the monitor,
   contact position movement means for allowing the contact position to be movable in the expected pass display area by the input means until the moving object is dispatched from the pitcher character, and changing movement speed of the contact position in the expected pass display area in response to the characteristics of the pitcher character;
   final contact position identification means for identifying the contact position after movement as a final contact position; and
   moving object dispatch means for dispatching the moving object from the pitcher character to the final contact position.

6. A method for implementing a baseball video game by a computer, in which a moving object being a ball for the baseball game is dispatched from a character displayed on a touch panel type of monitor, the method comprising:
   setting by a control unit of the computer an expected pass display area of the moving object between a dispatch position of the moving object where a pitcher character exists and an arrival position of the moving object where a catcher character exists;
   initiating by the control unit of the computer a dispatch operation of a pitcher character;
   identifying by the control unit of the computer a contact position of input means in the expected pass display area when the input means is placed into contact with the expected pass display area of the monitor;
   allowing by the control unit of the computer the contact position to be movable in the expected pass display area by the input means until the moving object is dispatched from the pitcher character;
   changing by the control unit of the computer movement speed of the contact position in the expected pass display area in response to the characteristics of the pitcher character;
   identifying by the control unit of the computer the contact position after movement as a final contact position; and
   dispatching by the control unit of the computer the moving object from the pitcher character to the final contact position.

* * * * *